ALEXANDER R. MAXEY
INVENTOR.
BY Robert S. Clay
ATTORNEY

ALEXANDER R. MAXEY
INVENTOR.

BY Robert S. Clay
ATTORNEY

PLURAL MOTOR DRIVE CONTROL APPARATUS

Filed Aug. 22, 1960 5 Sheets-Sheet 3

ALEXANDER R. MAXEY
INVENTOR.

BY Robert G. Clay
ATTORNEY

PLURAL MOTOR DRIVE CONTROL APPARATUS

Filed Aug. 22, 1960 5 Sheets-Sheet 4

ALEXANDER R. MAXEY
INVENTOR.

BY Robert G. Clay
ATTORNEY

ALEXANDER R. MAXEY
INVENTOR.
BY Robert H. Clay
ATTORNEY

United States Patent Office
3,179,870
Patented Apr. 20, 1965

3,179,870

PLURAL MOTOR DRIVE CONTROL APPARATUS

Alexander R. Maxey, Palo Alto, Calif., assignor to Ampex Corporation, Redwood City, Calif., a corporation of California Filed Aug. 22, 1960, Ser. No. 51,038
2 Claims. (Cl. 318—302)

This invention relates to apparatus for maintaining the speed of rotating members substantially constant, and in particular to speed control apparatus for magnetic tape transport equipment.

There are presently available different commercial apparatus for magnetically recording and reproducing wide band signals such as video signals. One such apparatus, shown in Patent No. 2,866,012, includes a rotary head assembly comprising a drum having a plurality of transducer units mounted thereon. Magnetic tape is advanced perpendicular to the plane of rotation of the rotary head, and guide means cups the tape for contact with the transducer units. During playback, a rotary head assembly scans the recorded tape. Electronic switching means serve to successively connect the transducer units to a common signal circuit.

Equipment of this type has been manufactured for television recording and reproduction. The apparatus makes use of four transducer units which sweep across the tape along tracks that are substantially at right angles to the length of the tape.

In another type of system for magnetically recording signal information, the tape is driven about a cylindrical guide in a helical path. A rotary transducer assembly carrying spaced transducer heads lies within the cylindrical guide. The transducer assembly cooperates with the tape through a gap formed in the cylindrical guide and successive record tracks, which extend obliquely across the tape, are formed.

It is noted that with either of the above mentioned systems the speed of the tape relative to the speed of the rotating transducer units must be kept within relatively constant, narrowly defined limits. Circuitry for maintaining the relative speed within the required limits is shown in Patent No. 2,866,012 mentioned above.

It is an object of this invention to provide an improved drive control apparatus.

It is another object of this invention to provide a drive control apparatus that utilizes a main motor to provide the bulk of the required driving power and a secondary motor to provide corrective power.

It is another object of this invention to provide a drive control apparatus for magnetic tape transport systems wherein the main motor supplies power to a rotating head assembly and to a tape drive capstan, and a secondary motor supplies correction power to one of the aforementioned units.

According to this invention, a magnetic tape speed control system is provided wherein, during recording, a main motor supplies power to a rotating head assembly and to a tape drive capstan and a secondary motor supplies a predetermined amount of power to one of the above mentioned units. A reference signal is recorded on the tape during the recording process. During reproduction, the reference signal is reproduced and its frequency compared with a signal corresponding to the speed of drum rotation to produce an error signal. Said error signal is applied to a secondary motor to provide a load correction.

The invention will be described in greater detail in conjunction with the accompanying drawing in which.

Figure 1:
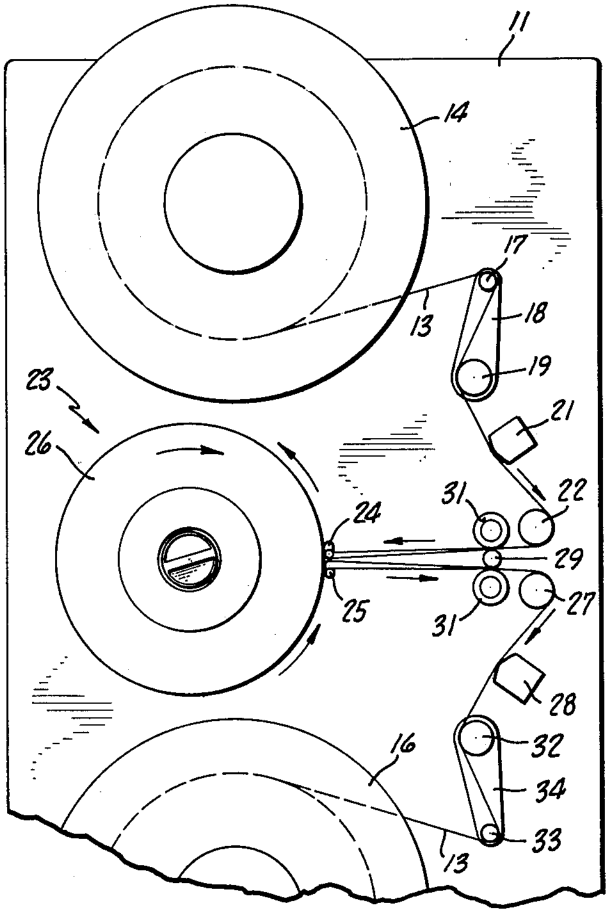
FIGURE 1 is a plan view of an embodiment of a magnetic tape apparatus incorporating the invention.

An apparatus which incorporates the invention, shown in FIGURE 1, comprises a base 11 upon which the components of the apparatus are mounted. Record tape 13, which may be of the pliable magnetic type, is carried by supply and take-up reels 14 and 16 that are carried by suitable motor drive turntables (not shown). The tape 13 leaving the reel 14 is shown engaged over a roller 17 that is carried by a spring pressed tape tensioning arm 18, and from there passes over a guide roller 19, across a stationary magnetic head 21 and over a roller 22 to an assembly 23, which may include a guide means 24 and 25 and a rotary head assembly 26. From the assembly 23, the tape passes over a guide roller 27, across a stationary head 28, and into engagement with a driving capstan 29. A clamping roller 31 may be engaged by a solenoid or like means (not shown) to clamp the tape against the driving capstan 29. From the driving capstan 29, the tape 13 extends about a guide roller 32 and over a roller 33 on a spring pressed tension arm 34, to the take-up reel 16. The heads 21 and 28 may be employed to operate upon margins of the tape, and one may, for example, record a sound track and the other, a control frequency for controlling the driving speed of the tape during playback.

Figure 2:
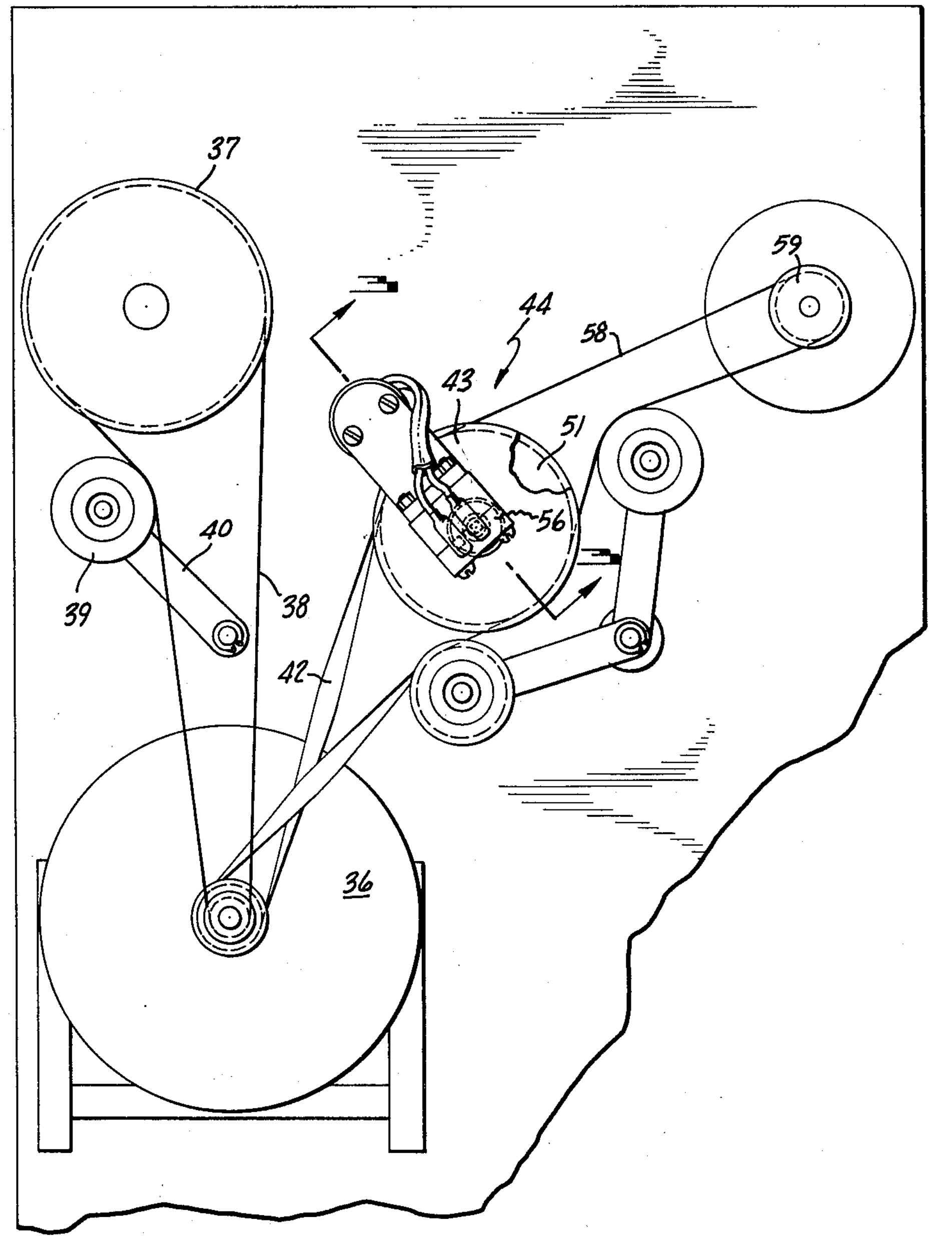
FIGURE 2 is a schematic illustration of a drive assembly in accordance with such embodiment of the invention.
Figure 3:
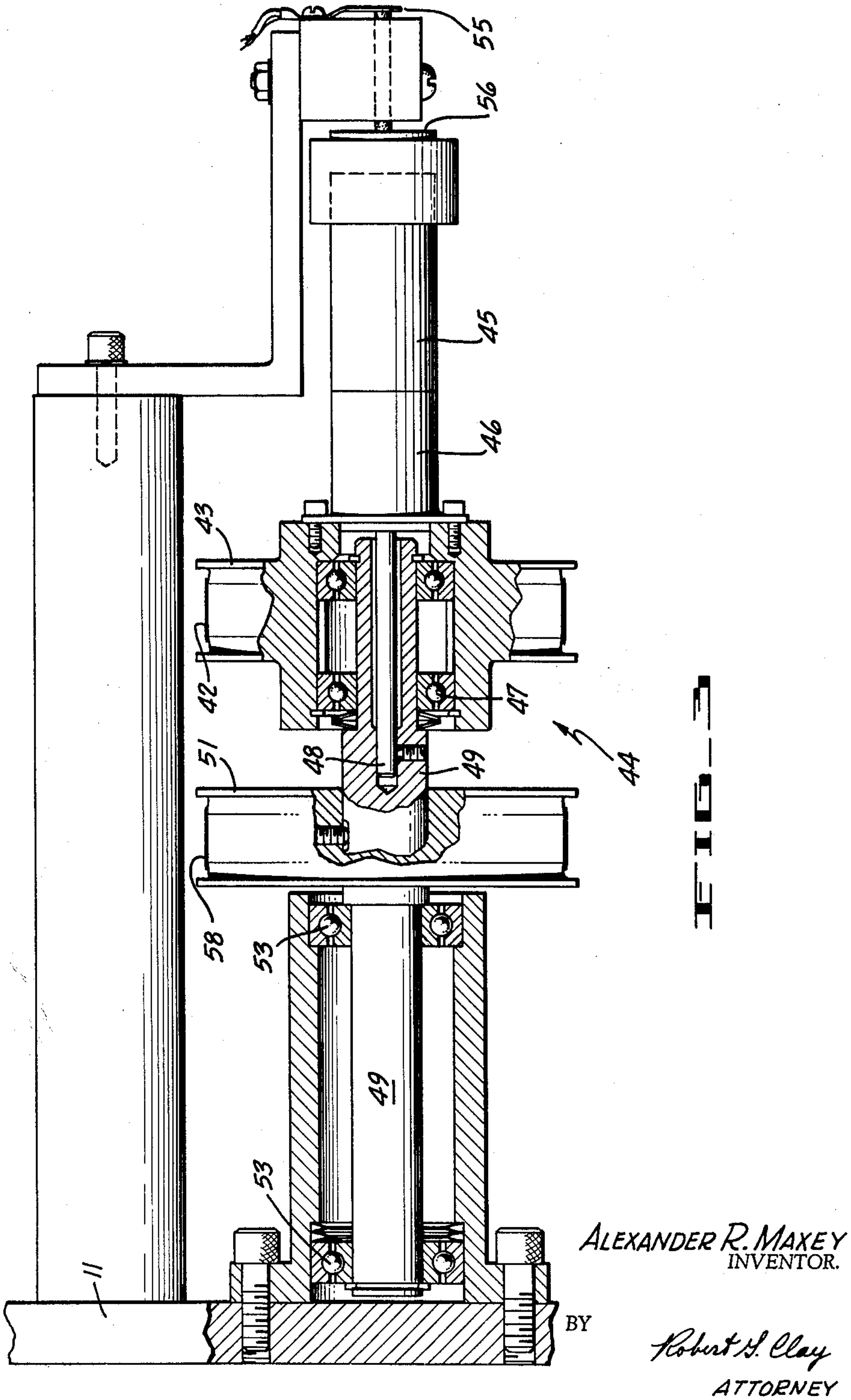
FIGURE 3 is a sectional view taken along the lines 3—3 of FIGURE 2.

In FIGURES 2 and 3, apparatus embodying the invention comprises a main or master drive motor 36 that is employed to drive a capstan pulley 37 by a belt 38 in a conventional manner. A roller 39 on a spring tension arm 40 maintains the required drive tension in the belt 38. Consequently, the capstan 29 is driven entirely by the master drive motor 36. A second belt 42 about the shaft of the master drive motor 36 is disposed about a pulley 43 of a drive control assembly 44. Pulley 43 is secured to the housing of a gear train 46, which is in turn secured to the stator of a small secondary motor 45. The stator of the secondary motor 45, together with the housing of gear train 46 and the pulley 43, is disposed to rotate about bearings 47 thereby providing an absolute rotation of the motor 45 due to the operation of the master drive motor 36. The rotor or armature of the secondary motor 45 is coupled to a shaft 48 and a shaft 49 and drive pulley 51, the coupling being through the gears (not shown) of gear train 46; and the shaft 49 and pulley 51 are mounted to freely rotate within the bearings 47. The shaft 49 is extended through the pulley 51 and into rotating engagement with bearings 53. The gear train 46 is of a well known type providing a rotational speed reduction and consequent torque-multiplication in the direction from the rotor of motor 45 to shaft 48, and conversely, torque-reduction and speed multiplication in the direction from the shaft 48 to the rotor of the motor 45.

Power may be applied to the motor 45 through terminals 55 and slip ring assembly 56.

A belt 58, engaged on the pulley 51, is employed to drive the rotating drum pulley 59, which in turn drives the rotating head assembly 26. Thus, it is seen that the capstan 29 of FIGURE 1 is driven entirely by the master drive motor 36, whereas the rotating head assembly 26 has its power partly supplied by the master drive motor 36 and partly by the secondary motor 45.

Figure 4:
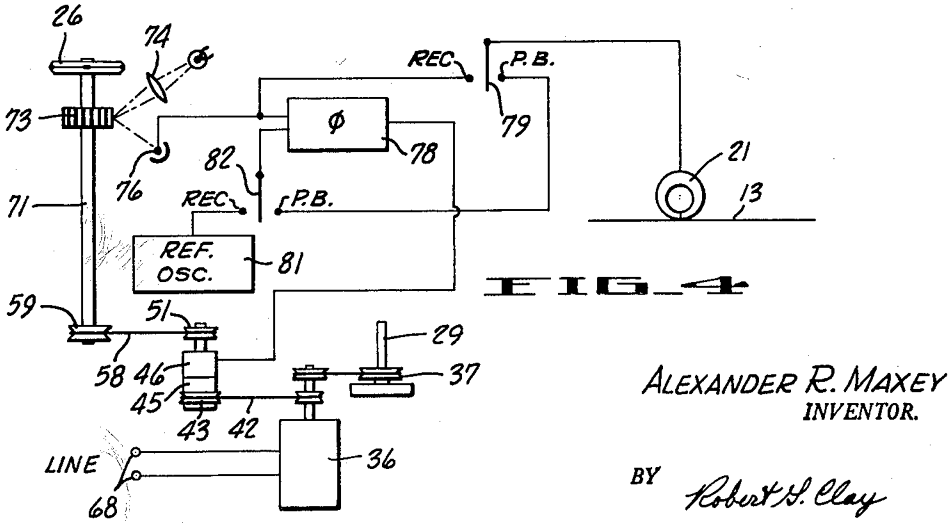
FIGURE 4 is a schematic diagram of a circuit that may be used in accordance with the invention.

Operation of the apparatus is described with relation to the schematic diagram of FIGURE 4 wherein components similar to those described above have similar reference numerals. The rototing drum pulley 59 is affixed to a shaft 71 upon which are also affixed the rotating head assembly 26 and a disc 73. Disc 73 is constructed to be alternately light reflecting and nonreflecting whereby light from a source 74 is alternately reflected and not reflected to a photoelectric cell 76 to produce thereby a signal input to a phase comparator 78. During the record mode, the signal from the photoelectric cell 76 is also applied through a switch 79 and magnetic head 21 to a marginal track on the tape 13. Consequently, a signal is recorded on the tape dependent upon the rotational speed of the rotating head assembly 26 relative to the tape speed or speed of the capstan 29. A second input to the phase comparator 78 is applied during the record mode from a reference oscillator 81 through a switch 82. In practice, the reference oscillator 81 need not be a separate oscillator but may be any synchronous signal that is available, such as the vertical synchronizing pulses from a video signal being recorded. Suitable frequency dividers or multipliers may be utilized to equate the signal from the photoelectric cell 76 to the reference oscillator 81 when the velocity of rotation is optimum. The phase comparator 78 produces a D.-C. output signal dependent upon the comparison to the aforementioned signals. The output is applied to the motor 45 to thereby control the speed of the rotating head assembly 26 relative to the speed of the capstan 29.

During the playback mode, the switches 79 and 82 are switched to their playback positions whereby the signal previously recorded on the marginal track of the tape 13 is reproduced and applied as an input to the phase comparator 78. This signal compared with the output from the photoelectric cell 76 produces an output to be applied to the motor 45. The amount of the output from the phase comparator 78 is dependent upon the velocity of the rotating head assembly 26 as determined by the reflection from the disc 73 and the speed of the capstan or tape.

Although the phase comparator 78 may serve to cause rotation of the motor 45 in either direction, in practice, it is preferred that the armature of the motor 45 always rotate in one direction so as to eliminate the possibility of stall during velocity reversal. This may be accomplished by selection of pulley sizes on the master drive motor 36 so as to give the rotating head assembly 26 a tendency to rotate either too fast or too slow relative to the capstan. Consequently, the phase comparator 78 will always produce an output and the motor 45 will continuously rotate in one direction.

As an example of the correction which may be used to provide the continuous rotation in one direction, it may be assumed that the motor 45 employed is a small D.-C. motor with a maximum rotational velocity of 12,000 r.p.m. The pulleys associated with the master drive motor 36 may be selected such that the secondary motor 45 must rotate at approximately 8,000 r.p.m. to cause the head assembly 26 to operate at the correct velocity. Consequently, the motor 45 may contribute a correction velocity of $\pm$4000 r.p.m. about the center velocity of 8000 r.p.m. Then, the minimum rotation of the motor 45 will be 4000 r.p.m. and the possibility of stall at low speed is eliminated.

It is noted that the relative rotational speed of the shafts 48 and 49 and the pulley 51 with respect to the stator of motor 45 and the pulley 43 is much less than the operating speed above described for the motor 45, because of the speed-reducing gear train 46. For example, the gear train 46 may effect a speed reduction on the order of 700–1 and a corresponding torque multiplication on the order of 300–1. This torque multiplication is needed to enable the relatively low-power low-torque control motor 45 to move the load (head assembly 26) and to effectively transmit the driving force of the relatively high-torque drive motor 36 to the load. It is also noted that in the present use, the probable error in drive speed is a small fraction of the desired operating speed of the driven member (head assembly 26), and that the operating speed range noted above for the motor 45 is sufficient to provide effective compensation, in cooperation with the speed-reducing gear train 46.

Thus, it is seen that the master drive motor 36 applies all the power to the capstan 29 and the bulk of the power to the rotating head assembly 26. A small portion of the power to the rotating head assembly 26 is applied through the motor 45 to provide a drive velocity control. In effect the main power drive is provided by a powerful motor that is costly to control directly, and a sensitive speed control is provided by a subsidiary small low-power motor that is economical to control directly. It is seen that the circuitry required for the drive control is relatively simple utilizing merely a phase comparator and a source of reference frequency. In video record systems, the reference frequency is readily available and an oscillator is not required.

Figure 5:
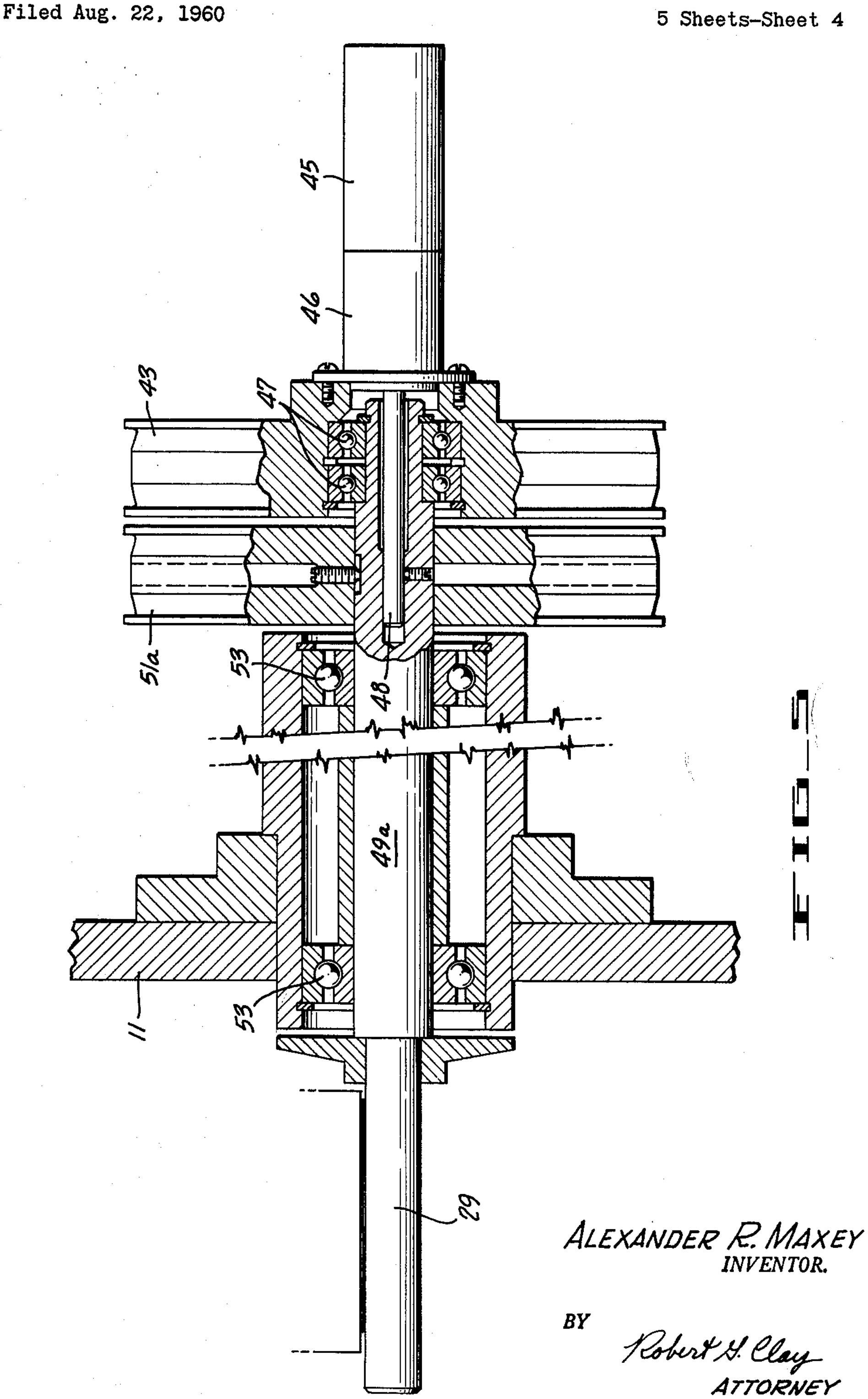
FIGURE 5 is a sectional view of another embodiment of the invention wherein a drive capstan is driven directly from the secondary motor shaft.

Referring to FIGURE 5, another embodiment of the invention is shown wherein the shaft **49*a* connected to the pulley 51*a*, similar to the shaft 49 and pulley 51 of FIGURE 3, is connected directly to the capstan 29. With this arrangement, the belt 42 may be passed about the pulley 43 to provide rotation of the stator of the motor 45. Power may be applied to the motor 45 as discussed with respect to the embodiment of FIGURE 3, and the rotation of the armature and gear-train shaft 48 may be used to drive the capstan 29 directly. On the other hand, the pulley 51*a* may be rotated by the belt 42 to provide direct drive of the capstan 29 without assistance from the motor 45. In this latter arrangement, the pulley 43 and the motor 45 may be utilized to provide power to another member whose speed relative to the capstan 29** may be controlled.

Figures 6, 7:
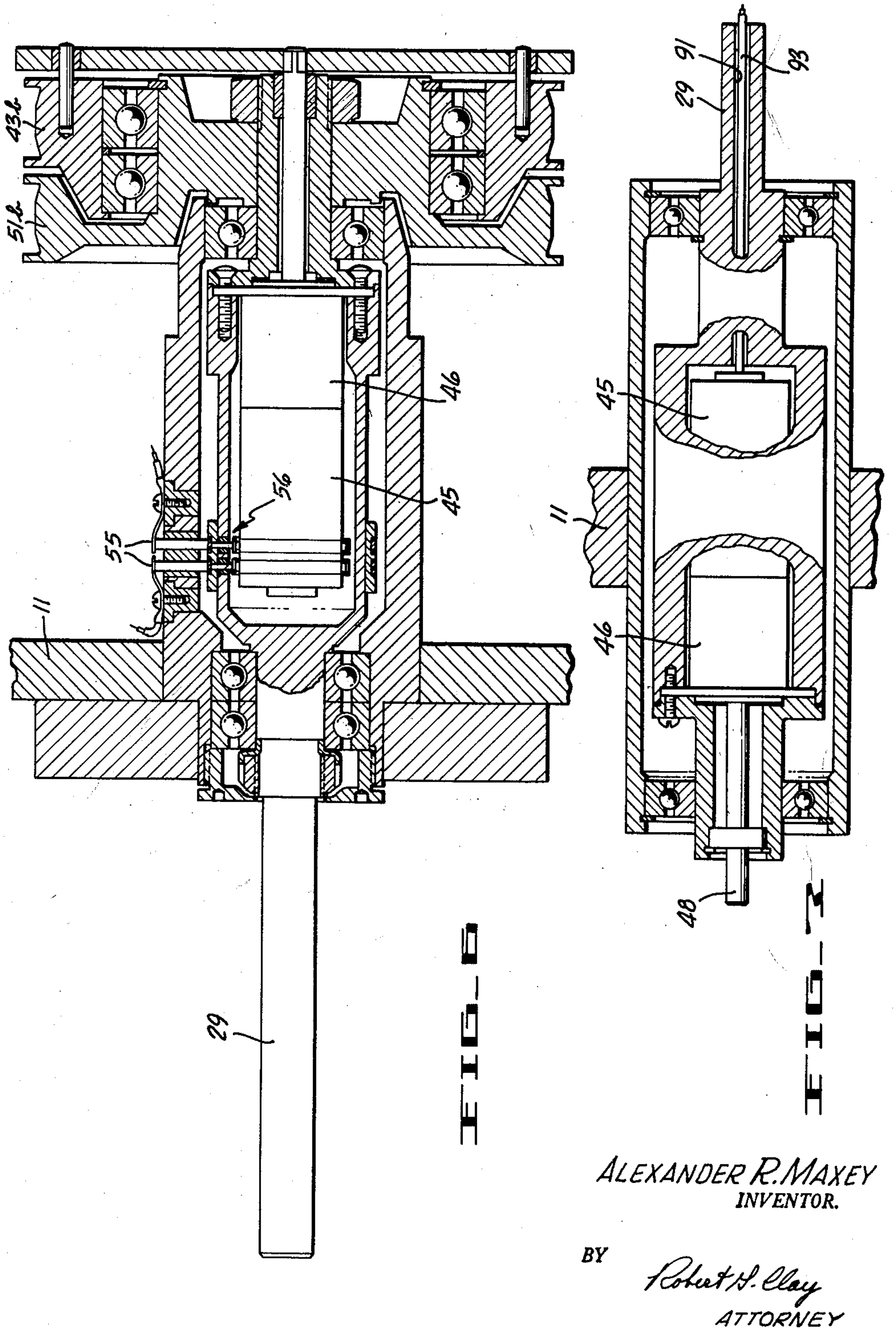
FIGURE 6 is a sectional diagram of another embodiment of the invention wherein the capstan is driven directly from the stator of the secondary motor.
FIGURE 7 is another embodiment of the invention wherein the capstan is driven by the rotor of the secondary motor.

The embodiment shown in FIGURE 6 is similar to that shown in FIGURE 5 with the difference that the capstan 29 is directly connected to the frame of the gear train 46 and to the stator of the motor 45 rather than to the rotor or armature. Power may be applied to the motor 45 through the terminals 55 and slip ring assembly 56. In this embodiment, the pulley **51*b* may be utilized to directly drive the capstan 29 without the assistance of the motor 45. The pulley 43*b* may be used to drive the capstan 29 with the motor 45**.

The embodiment shown in FIGURE 7 is quite similar to that shown in FIGURE 6 wherein the stator of the motor 45 is coupled through the frame of the gear train 46 to the capstan 29. The rotor of the motor 45 may be driven through the gear-train shaft 48 by any convenient means. The capstan 29 in the embodiment shown in FIGURE 7 contains a central opening 91 wherethrough the lines 93 supplying power to the motor 45 may pass.

Thus, it is seen that a drive control system is provided wherein the bulk of power is supplied by a master drive motor and a correction power is supplied from a secondary motor. Although the devices described in the above mentioned embodiments utilize a D.-C. motor for correction, it is apparent that a synchronous type motor may be utilized. In order to utilize a synchronous type motor, the output of the phase comparator 78 of FIGURE 4 should be applied to an amplitude sensitive oscillator circuit, the output of which may apply the required signal to the motor 45.

In addition, although in connection with the embodiments described above, the motor 45 normally operates in one direction only, it is apparent that the scope of the invention includes those motors wherein the operation is reversible. It is also apparent that the drive correction may be applied to a single driven element without reference to another element driven solely by the main drive motor.

What is claimed is:

1. A drive system for a rotating load, comprising:

a main drive motor having a predetermined operating speed and delivering a predetermined torque at said operating speed;

a variable-speed secondary motor having a predetermined operating speed range wherein said secondary motor delivers a substantially lower torque and has a lower power consumption than said main drive motor;

a speed-reducing gear train having a torque-multiplying characteristic of a predetermined value suitable for multiplying said torque of said secondary motor to the order of said main drive motor torque, said gear train being mounted entirely on said secondary motor and forming an assembly therewith including an output element delivering torque matching said main drive motor torque at low output speed and low power consumption;

said assembly being coupled to said main drive motor so as to be bodily driven thereby, and said output element of said assembly being coupled to said load to drive the same at a speed that is the sum of said main drive motor speed and said low output speed of said assembly; and means for sensing the difference between the rotational frequency of said load and a predetermined frequency, said means being coupled to said secondary motor for varying the speed of said secondary motor in accordance with said sensed frequency difference and for maintaining said load at said predetermined rotational frequency, without altering the speed of said main drive motor.

2. In a tape recording and reproducing system of the type in which a pliable tape is driven by a capstan past a transversely rotating transducer unit, a drive system comprising:

a main drive motor directly coupled to said capstan for driving same at a predetermined operating speed, said main drive motor having a predetermined torque output at said operating speed;

a variable-speed secondary motor having a predetermined operating speed range wherein said secondary motor delivers a substantially lower torque and has a lower power consumption than said main drive motor;

a speed-reducing gear train having a torque-multiplying characteristic of a predetermined value suitable for multiplying said torque of said secondary motor to the order of said main drive motor torque, said gear train being mounted entirely on said secondary motor and forming an assembly therewith including an output element delivering torque matching said main drive motor torque at low output speed and low power consumption;

said assembly being coupled to said main drive motor so as to be bodily driven thereby, and said output element of said assembly being coupled to said load to drive the same at a speed that is the sum of said main drive motor speed and said low output speed of said assembly;

means for sensing the rotational frequency of said transducer unit and for producing a sensing signal representative thereof;

a phase comparator for receiving and sensing signal and for comparing same to an input frequency, said last-named means being coupled to said secondary motor for maintaining the rotational frequency of said transducer unit in synchronism with said input frequency;

reference frequency means coupled to said phase comparator and operative only during the record mode for supplying said input frequency thereto;

fixed transducer means engaging said tape; and means for coupling said fixed transducer means to said sensing means during the record mode for recording said sensing signal on said tape;

said last-named means being operable for coupling said fixed transducer means to said phase comparator during the reproduce mode to supply said recorded signal to said phase comparator as said input frequency.

References Cited by the Examiner

UNITED STATES PATENTS

| | | | |
|---|---|---|---|
| 1,791,498 | 2/31 | Halliburton et al. | 318—45 X |
| 2,537,770 | 1/51 | Livingston et al. | 318—30 |
| 2,551,021 | 5/51 | Lee | 318—320 |
| 2,577,190 | 12/51 | Hare | 318—70 X |
| 2,816,257 | 12/57 | Burdorf | 318—59 X |
| 2,828,459 | 3/58 | Pear | 318—77 X |
| 2,885,625 | 5/59 | Pittman | 318—320 X |
| 2,886,757 | 5/59 | Johnson | 318—318 |
| 2,894,187 | 7/59 | Chapman | 318—77 X |
| 3,016,428 | 1/62 | Kabell et al. | 318—314 X |
| 3,086,157 | 4/63 | Branco | 318—318 X |

ORIS L. RADER, *Primary Examiner*

JOHN F. COUCH, *Examiner.*